United States Patent [19]

Berchtold et al.

[11] Patent Number: 6,154,746
[45] Date of Patent: Nov. 28, 2000

[54] HIGH-DIMENSIONAL INDEX STRUCTURE

[75] Inventors: Stefan Berchtold, New Providence, N.J.; Christian Boehm, Rosenheim; Hans-Peter Kriegel, Bobingen, both of Germany

[73] Assignee: AT&T Corp., New York, N.Y.

[21] Appl. No.: 09/063,780

[22] Filed: Apr. 22, 1998

[51] Int. Cl.$^7$ .................................................. G06F 17/30
[52] U.S. Cl. .......................... 707/100; 707/101; 707/102; 707/2; 707/3
[58] Field of Search ................................... 707/100, 101, 707/102, 2, 3

[56] References Cited

U.S. PATENT DOCUMENTS 5,701,467  12/1997  Freeston ................................. 707/100
5,778,354   7/1998  Leslie et al. .............................. 707/2

OTHER PUBLICATIONS

Berchtold, S., Bohm, C., Braunmuller, B.,Keim, D.A., Kriegel, H–P. "Fast Parallel Similarity Search in Multimedia Databases"—Proc. ACM SIGMOD, Int. Conf. On Management of Data, Jan. 1997, Tucson, Arizona—pp. 1 thru 12.

Berchtold, S., Bohm, C., Keim, D., Kriegel, H–P.: "A Cost Model For Nearest Neighbor Search in High–Dimensional Data Space"—ACM PODS Symposium on Principles of Database Systems, Jan. 1997, Tucson, AZ—PP. 78 thru 86.

Berchtold, S., Ertl, B., Keim, D., Kriegel, H–P.: Fast Neighbor Search in High–dimensional Space—Proc. 14th Int. Conf. On Data Engineering, Orlando, Jan. 1998—pp. 209 thru 218.

Comer, D., "The Ubiquitos B–tree "—ACM Computing Surveys 11 (2), Jan. 1979, pp. 121 thru 137.

Chaudhuri, S., Dayal, U "Data Warehousing and OLAP for Decision Support", Tutorial, Proc., ACM SIGMOD Int. Conf. On Management of Data, Jan. 1997, Tucson, AZ—pp. 507–508.

Faloustsos, C., Barber, R., Flickner, M., Hafner, J., et al., "Efficient and Effective Querying by Image Content", Journal of Intelligent Information Systems, Jan. 1994, vol. 3—pp. 231 thru 262.

Faloutsos, C., Bhagwat, P. "Declustering Using Fractals", PDIS Journal of Parallel and Distributed Information Systems, Jan. 1993,—pp. 18 thru 34.

Friedman, J.H., Bently, J.L., Finkel, R.A., "An Algorithm for Finding Best Matches in Logarithmic Expected Time" ACM Transactions on Mathematical Software., vol. 3, No. 3, Sep. 1977—pp. 209 thru 226.

Hjaltason, G.R., Samet, H., "Ranking in Spatial Databases", Proc. 4th In. Symp. On Large Spatial Databases, Portland, ME Jan. 1995, pp. 1 thru 13.

Jagadish, H.V., "A Retrieval Technique for Similar Shapes", Proc. ACM SIGMOD Int. Conf. On Management of Data, Jan. 1991—pp. 208 thru 217.

Jain, R., White, D.A., "Similarity Indexing: Algorithms and Performance", Proc. SPIE Storage and Retrieval for Image and Video Databses IV, vol. 2670, San Jose, CA., Jan. 1996—pp. 62 thru 73.

Katayama, N., Satoh, S., "The SR–tree: An Index Structure for High–Dimensional Nearest Neighbor Queries", Proc. ACM SIGMOD Int. Conf. On Management of Data, Jan. 1997—pp. 369 thru 380.

(List continued on next page.)

*Primary Examiner*—John Breene
*Assistant Examiner*—Cheryl Lewis
*Attorney, Agent, or Firm*—Banner & Witcoff, Ltd.

[57] ABSTRACT

A method for transforming multi-dimensional data points into 1-dimensional values which are stored in a 1-dimensional index structure is disclosed. The data space is divided into a first plurality of pyramids each having a center point of the data space as a top and a (d−1) dimensional surface of the data space as a base, wherein the first plurality of pyramids is equal to twice the number of dimensions of the data space. Each pyramid is then divided into a second plurality of partitions. A Pyramid-value for each partition is then computed. Finally, each partition is stored in the index structure using the Pyramid-value as an index key.

12 Claims, 9 Drawing Sheets

OTHER PUBLICATIONS

Lin, K., Jagadish, H.V., Faloutsos, C., "The TV–tree—an index structure for high–dimensional data", VLDB Journal, vol. 3, Jan. 1995—pp. 1 thru 30.

Mehrotra, R., Gary J., "Feature–Based retrieval of Similar Shapes", Proc. 9th Int. Conf. On Data Engineering, Apr. 1993—pp. 108 thru 115.

Robinson, J.T., "The K–D–B Tree: A Search Structure for Large Multidimensional Dynamic Indexes", Proc. ACM SIGMOD Int. Conf. On Management of Data, Jan. 1981,—pp. 10 thru 18.

Seidl, T., Kriegel, H.P. "Efficient User–Adaptable Similarity Search in Large Mutlimedia Databases", Proc. 23rd. Int. Conf., on Very Large Databases (VLDB 97), Athens, Greece, Jan. 1997.

White, D.A., Jain, R., "Similarity Indexing with the SS–tree", Proc. 12th Int. Conf. On Data Engineering, New Orleans, LA., Jan. 1996—pp. 516 thru 523.

Beckmann, N., Kriegel, H–P., Schneider, R., Seeger, B.,: The R*–tree: An Efficient and Robust Access Method for Points and Rectangles. Jan. 1990 ACM SIGMOD Int. Conf. On Management of Data, Atlantic City, NJ 1990–pp. 322 thru 331.

Berchtold, S., Keim, D., Kriegel, H–P.: The X–tree: An Index Structure for High–Dimensional Data. Proceedings ot the 22nd VLDB Conference, Mumbai (Bombay), India, Jan. 1996—pp. 1 thru 12.

Berchtold, S., Bohm, C., Kriegel, H–P.: Improving the Query Performance of High–Dimensional Index Structures by Bulk Load Operations—submitted, no date.

Berchtold, S., Bohm, C., Braunmuller, B., Keim, D.A., Kriegel, H–P. "Fast Parallel Similarity Search in Multimedia Databases"—Pro. ACM SIGMOD, Int. Conf. On Management of Data, Tucson, Arizona—pp. 1 thru 12, 1997.

BALANCED      PYRAMID-TREE

FIRST STEP →

SECOND STEP →

```
Point_Set PyrTree::range_query(range q)
{
 Point_Set res;
 for (i=0; i < 2d; i++) {
  if (intersect(p[i], q) {
  // using Lemma 1
    determine_range(p[i], q, h_low, h_high);
  // using Lemma 2
    cs = btree_query(i+h_low, i+h_high);
    for (c = cs.first; cs.end; cs.next) {
    if (inside(q, c))
      res.add(c);
   }
  }
 }
 return res;
}
```

FIG. 12

QUERY ANCHOR
QUERY RECTANGLE
☐ CANDIDATES IN $p_i$ (THE "AFFECTED PART")
Pi

CLUSTERED DATA

FIG. 14B

PYRAMID-TREE

FIG. 14C

ADAPTED PYRAMID-TREE

HIGH-DIMENSIONAL INDEX STRUCTURE

FIELD OF THE INVENTION

The present invention relates to a high-dimensional index structure which does not deteriorate when indexing data of higher dimensionality.

BACKGROUND OF THE INVENTION

With the amount of information often desired to be stored in a database system increasing, data or complete records are often stored in more than one database storage site. One important aspect of the database programs is the ability to provide fast and efficient access to records in each individual database. To properly handle the distribution and retrieval of the data, data processing systems often include database management programs. These programs provide easy access to database information that may each consist of a multiple of records stored at many nodes and sites. Relational database management programs provide this capability.

One common configuration of a database is one that is made up of various tables with each table consisting of rows and columns of information. The information stored across one row in the table would make up one record and the fields of the record would be columns in the table. In other words, the table would contain rows of individual records and columns of record fields. Because one record may contain more than one field of information, the information of the field would make up the columns of the database table. Other database configurations are found in the art. Database management programs support multiple users thereby enabling each user to access the same table concurrently.

An index file is commonly used by database management programs to provide quick and efficient associative access to a table's records. These index files are commonly configured in a B-Tree structure which consists of a root node with many levels of nodes branching from the root node. The information contained in these nodes may include pointers which point to the nodes at the next level of the tree or it may include pointers which point to one or more records stored in the database. These pointers include additional key record information which may reference the records stored in the database. The record keys are stored in an ordered form throughout the nodes at the various branches of the tree. For example, an index tree may exist for an alphabetic listing of employee names. The root node would include reference key data that relates to individual record information that may be indirectly or directly referenced by the next level of nodes in the tree. The reference keys contain information about the index field, e.g., the alphabetic spelling of the employee's name. Therefore, the ordered keys in the root node would point to the next successive level of nodes. In other words, the next successive node may indirectly or directly reference all employee names beginning with letters A–H. A next successive node, parallel with the first successive node, may contain employee records whose last name begins with the letters I–P. The last successive node on this level would reference records of employees with last names starting with Q–Z. As one searches through the index tree, a bottom node is eventually reached. The contents of the bottom node may include record key information that further points to individual records in storage or may point back to one of the branch nodes in the tree.

During recent years, a variety of new database applications have been developed which substantially differ from conventional database applications in many respects. For example, new database applications such as data warehousing produce very large relations which require a multidimensional view on the data, and in areas such as multimedia, a content-based search is essential which is often implemented using some kind of feature vectors. All the new applications have in common that the underlying database system has to support query processing on large amounts of high-dimensional data. The question is what is the difference between processing low- and high-dimensional data. A result of recent research activities is that basically none of the querying and indexing techniques which provide good results on low-dimensional data also performs sufficiently well on high-dimensional data for larger queries. Previously, the only approach taken to solve this problem for larger queries was parallelization. A variety of new index structures, cost models and query processing techniques have been proposed. Most of the index structures are extensions of multidimensional index structures adapted to the requirements of high-dimensional indexing. Thus, all these index structures are restricted with respect to the data space partitioning. Additionally, they suffer from the well-known drawbacks of multidimensional index structures such as high costs for insert and delete operations and a poor support of concurrency control and recovery. Recently, a few high-dimensional index structures have been proposed.

In "The TV-Tree: An Index Structure for High-Dimensional Data" by K. Lin et. al., VLDB Journal, Vol. 3, pp. 517–542, 1995, Lin et al. presented the TV-tree which is an R-tree-like index structure. The central concept of the TV- tree is the telescope vector (TV). Telescope vectors divide attributes into three classes: attributes which are common to all data items in a subtree, attributes which are ignored and attributes which are used for branching in the directory. The motivation for ignoring attributes is that a sufficiently high selectivity can often be achieved by considering only a subset of the attributes. Therefore, the remaining attributes have no chance to substantially contribute to query processing. Obviously, redundant storage of common attributes does not contribute to query processing either. The major drawback of the TV-tree is that information about the behavior of single attributes, e.g. their selectivity, is required.

Another R-tree-like high-dimensional index structure is the SS-tree which uses spheres instead of bounding boxes in the directory and was disclosed in "Similarity Indexing With the SS-Tree" by D. A White and R. Jain, Proc 12th Int. Conference on Data Engineering, New Orleans, La., 1996. Although the SS-tree clearly outperforms the $R^*$-tree, spheres tend to overlap in high-dimensional spaces. Thus, recently a improvement of the SS-tree has been proposed in "The SR-Tree: An Index Structure for High-Dimensional Nearest Neighbor Queries" by N. Katayama and S. Satah, Proc. ACM SIGMOD Int. Conference on Management of Data, 1997, pp. 369–380, where the concepts of the R-tree and SS-tree are integrated into a new index structure, the SR-tree. The directory of the SR-tree consists of spheres (SS-tree) and hyper-rectangles (R-tree) such that the area corresponding to a directory entry is the intersection between the sphere and the hyper-rectangle. Therefore, the SR- tree outperforms both the $R^*$-tree and the SS-tree.

In "Similarity Indexing: Algorithms and Performance" by R. Jain and D. A. White, Proc. SPIE Storage and Retrieval for Image and Video Databases IV, Vol. 2670, pp. 62–75, San Jose, Calif. 1996, the VAM-Split R-tree and the VAM-Split KD-tree are introduced. Both are static index structures, i.e., all data items must be available at the time of creating the index. VAM-Split trees are rather similar to KD-trees, however in contrast to KD-trees, splits are not performed using the 50%- quantile of the data according to the split dimension, but on the value where the maximum variance can be achieved. VAM Split trees are built in main memory and then stored on secondary storage. Therefore, the size of a VAM Split tree is limited by the main memory available during the creation of the index.

In "The X-Tree: An Index Structure for High-Dimensional Data" by S. Berchtold et. al., 22nd Conference on Very Large Databases, Bombay, India, pp.28–39, 1996, the X-tree has been proposed which is an index structure adapting the algorithms of $R^*$-trees to high-dimensional data using two techniques: First, the X-tree introduces an overlap-free split algorithm which is based on the split history of the tree. Second, if the overlap-free split algorithm leads to an unbalanced directory, the X-tree omits the split and the according directory node becomes a so-called super-node. Supernodes are directory nodes which are enlarged by a multiple of the block size. The X-tree outperforms the $R^*$-tree by a factor of up to 400 for point queries.

All these approaches have in common that they must use the 50%-quantile when splitting a data page in order to fulfill storage utilization guarantees. As will be shown below, this is the worst case in high-dimensional indexing, because the resulting pages have an access probability close to 100%.

To overcome this drawback, S. Berchtold et. al. recently proposed another approach in "Improving the Query Performance of High-Dimensional Index Structures Using Bulk-Load Operations" 1998, where unbalanced partitioning of space was applied. The proposed technique is an efficient bulk-loading operation of an X-tree. However, the approach is applicable only if all the data is known a priori which is not always the case. Additionally, due to restrictions of the X-tree directory, a peel-like partitioning cannot be achieved which is important for indexing high-dimensional data spaces, as will be described below.

SUMMARY OF THE INVENTION

Motivated by these disadvantages of state-of-the-art index structures for high-dimensional data spaces, the Pyramid-Technique was developed. The Pyramid-Technique is based on a special partitioning strategy which is optimized for high-dimensional data. The basic idea is to divide the data space such that the resulting partitions are shaped like peels of an onion. Such partitions cannot be efficiently stored by R-tree-like index structures. However, the partitioning is achieved by first dividing the d-dimensional space into 2d pyramids having the center point of the space as their top. In a second step, the single pyramids are cut into slices parallel to the base of the pyramid forming the data pages. This strategy outperforms other partitioning strategies when processing range queries. Furthermore, range query processing using the present invention is not affected by the so-called "curse of dimensionality" i.e., the performance of the Pyramid-Technique does not deteriorate when going to higher dimensions. Instead, the performance improves for increasing dimension.

Another advantage of the Pyramid-Technique is the fact that the present invention uses a mapping from the given d-dimensional data space to a 1-dimensional space in order to achieve the mentioned onion-like partitioning. Therefore, a B+-tree can be used to store the data items and take advantage of all the good properties of B+-trees such as fast insert, update and delete operations, good concurrency control and recovery, easy implementation and re-usage of existing B+-tree implementations. The Pyramid-Technique can easily be implemented on top of an existing DBMS.

According to one embodiment of the invention, a method for transforming multi-dimensional data points into 1-dimensional values which are stored in a 1-dimensional index structure is disclosed. The data space is divided into a first plurality of pyramids each having a center point of the data space as a top and a (d–1) dimensional surface of the data space as a base, wherein the first plurality of pyramids is equal to twice the number of dimensions of the data space. Each pyramid is then divided into a second plurality of partitions. A Pyramid-value for each partition is then computed. Finally, each partition is stored in the index structure using the Pyramid-value as an index key.

According to another embodiment of the invention, a method for storing and querying multi-dimensional data points is disclosed. The data space is divided into a first plurality of pyramids each having a center point of the data space as a top and a (d–1) dimensional surface of the data space as a base, wherein the first plurality of pyramids is equal to twice the number of dimensions of the data space. Each pyramid is then divided into a second plurality of partitions. A Pyramid-value for each partition is then computed. Each partition is then stored in the index structure using the Pyramid-value as an index key. The range of Pyramid-values affected by the query is then computed. The index is then queried using the range to produce a candidate set of partitions. Finally, all candidate partitions that are inside the query range are outputted.

BRIEF DESCRIPTION OF THE DRAWINGS

The invention will be described in detail in the following description of preferred embodiments with reference to the following figures, wherein:

FIGS. 10 (a)–(d) illustrate restriction of query rectangles;

FIGS. 14 (a)–(c) illustrates the effects of clustered data;

FIGS. 15 (a)–(c) are graphs of various transformation functions $t_i$;

DETAILED DESCRIPTION

Figure 1:
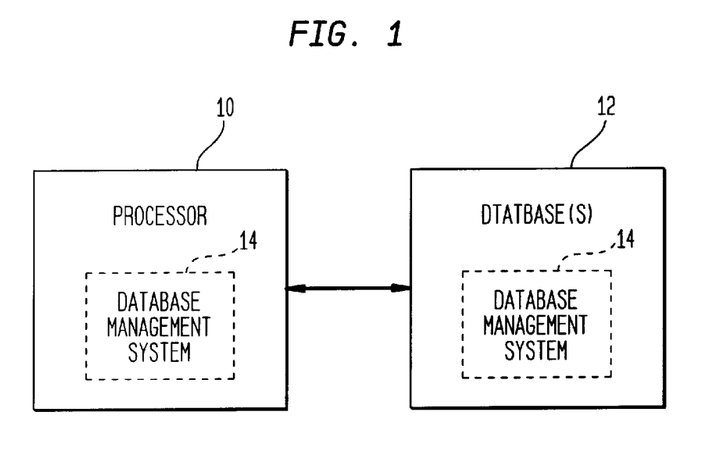
FIG. 1 illustrates a block diagram of a system employing the invention.

The invention relates to storing and querying data to and from at least one database. FIG. 1 illustrates a system with a processor 10 which is connected to at least one database 12. A database mamagement system 14 can reside in either/both the processor 10 and the database(s) 12 to control the flow of data in the database in accordance with at least one embodiment of the invention.

It is well-known that for low-dimensional indexes it is beneficial to minimize the perimeter of the bounding boxes of the page regions so that all sides of the bounding box have approximately the same length. Such space partitioning is usually achieved by recursively splitting the data space into equally filled regions, i.e., at the 50%-quantile. Therefore, this split strategy is called a "balanced split". In the following cost model, it is assumed that there is a database of N objects in a d-dimensional data space. The points are uniformly distributed in the unit hypercube $[0,1]^d$. As will be explained below, the present invention is also valid for real data which are correlated and clustered. Further, it is assumed that there are hypercubes with side-length q as queries, which are taken randomly from the data space.

In high-dimensional spaces, some unexpected effects lead to performance degeneration when applying a balanced split. The first observation is that, at least when applying balanced partitioning to a uniformly distributed data set, the data space cannot be split in each dimension. For example, assuming a 20-dimensional data space which has been split exactly once in each dimension, would require $2^{20}$=1,000,000 data pages or 30,000,000 data objects if the average page occupancy is 30 objects. The average page occupancy is called the effective page capacity $C_{eff}$. The data space is usually split only once in a number d' of dimensions and is not split in the remaining (d–d') dimensions. Thus, the bounding boxes of the page regions include almost the whole extension of the data space in these dimensions. If it is assumed that the data space is the d-dimensional unit hypercube $[0,1]^d$, the bounding boxes have approximately side length ½ in d' dimensions and approximately side length 1 in (d–d') dimensions. The number d' of dimensions, splitting the data space exactly once can be determined from the number N of objects stored in the database and the effective page capacity, as follows:

$$d' = \log_2\left(\frac{N}{C_{eff}}\right)$$

The second observation is that a similar property holds for typical range queries. If we assume that the range query is a hypercube and should have a selectivity s, then the side length q equals to the d-th root of s: $q=\sqrt[d]{s}$. For a 20-dimensional range query with selectivity 0.01% we obtain a side length q=0.63 which is larger than half of the extension of the data space in this dimension.

Figure 2:
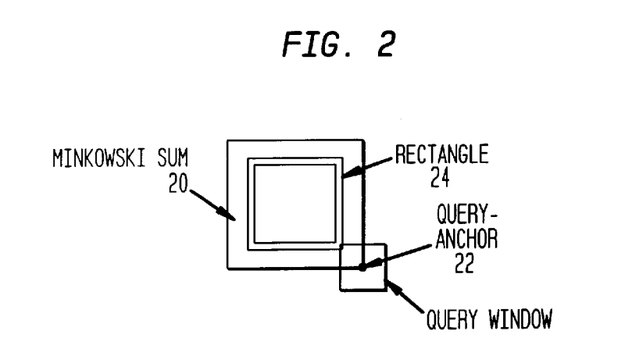
FIG. 2 illustrates a Minkowski Sum.

It becomes intuitively clear that a query with side length larger than 0.5 must intersect with every bounding box having at least side length 0.5 in each dimension. The performance of a multi-dimensional range query is usually modeled by means of the so-called Minkowski sum 20 which transforms the range query into an equivalent point query by enlarging the bounding boxes of the pages accordingly as illustrated in FIG. 2. In low-dimensional spaces, usually so-called boundary effects are neglected, i.e., the data space is assumed to be infinite and everywhere filled with objects according to the same density and therefore, no objects intersect the boundary of the data space.

To determine the probability that the bounding box of a page region intersects the query region, the portion of the data space in which the center point of the query must be located such that query and bounding box intersect must be considered. Therefore, the center point of the query, the query anchor 22, is moved to each point of the data space marking the positions where the query rectangle 24 intersects the bounding box. The resulting set of marked positions is called the Minkowski sum which is the original bounding box having all sides enlarged by the query side length q. Taking into account that the volume of the data space is 1, the Minkowski sum 20 directly corresponds to the intersection probability. In practice, often a corner of the query rather than the center is used as query anchor. Let $LLC_{ij}$ and $URC_{ij}$ denote the j-th coordinates of the "lower left" and "upper right" corner of boundingbox i ($0 \leq i \leq N$, $0 \leq j \leq d$). The expected value $P_{no\_bound\_eff}(q)$ for page accesses when processing a range query with side length q then is $$P_{no\_bound\_eff}(q) = \sum_i \prod_{j=0}^{d-1} (URC_{i,j} - LLC_{i,j} + q)$$

In order to adapt this formula to boundary effects, especially considering that the bounding boxes as well as the query hypercubes are always positioned completely in the data space, the following formula is obtained:

$$P_{no\_bound\_eff}(q) = \sum_i \prod_{j=0}^{d-1} \frac{\min(URC_{i,j}, 1-q) - \max(LLC_{i,j} - q, 0)}{1-q}$$

The minimum and maximum are necessary to cut the parts of the Minkowski sum exceeding the data space, whereas the denominator (1–q) is due to fact that the stochastic "event space" of the query anchor is not [0,1] but rather [0,1–q]. The model for balanced splits can be simplified if the number of data pages is a power of two. Then, all pages have the extension 0.5 in d' dimensions, accommodated in the lower or the upper half of the data space, and full extension in the remaining dimensions. $C_{eff}$ denotes the effective (average) capacity of a data page. It is dependent on d. As in the special case, all pages have the same access probability and thus, the expected value of data page accesses is:

$$E_{balanced}(d, q, N) = \frac{N}{C_{eff}(d)} \cdot \min\left(1, \left(\frac{0.5}{1-q}\right)^{\log_2\left(\frac{N}{C_{eff}(d)}\right)}\right)$$

It should be noted that the minimum is required to assure that the expected value doesn't exceed the total number of data pages and that it is possible to ignore the remaining (d–d') dimensions because the extension of the data pages in these dimensions is 1.

Figure 3:
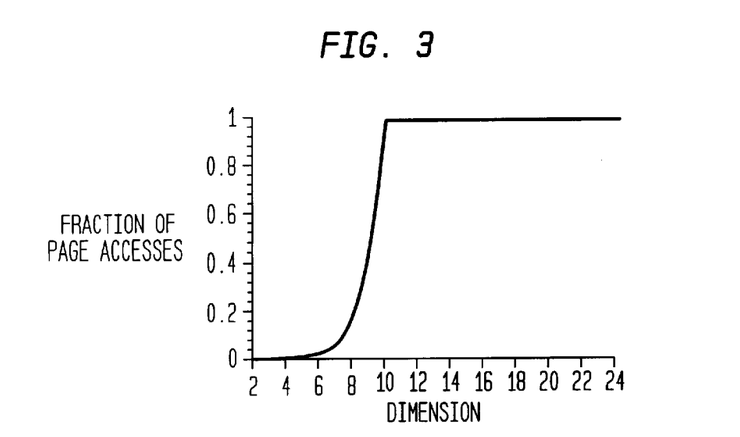
FIG. 3 is a graph illustrating estimated cost of query processing using the X-Tree.

FIG. 3 depicts the cost of range query processing using balanced splits, as estimated by the model. In this figure, the dimension is varied, whereas the database size and the selectivity of the query is constant. The percentage of accessed pages quickly approaches the 100%-mark which is actually met at dimension 10. Efficient query processing is only possible in dimensions less than 8.

Figure 4:
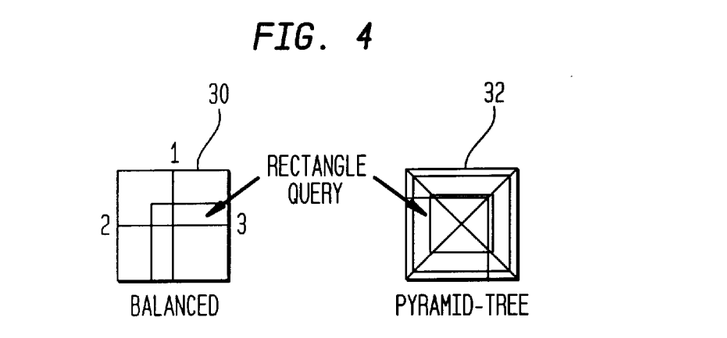
FIG. 4 illustrates partitioning strategies.

This performance degeneration is a problem of all index structures which strive for a split at or close to the 50%-quantile of a data set. The only way around the dilemma is to split in an unbalanced way. FIG. 4 depicts the partitions resulting from a balanced split 30 and a peel-like split of the Pyramid-Technique 32 in a 2-dimensional example. A large range query will intersect all of the partitions when splitting in a balanced way, but only a few pages, when splitting in peels.

Figure 5A:
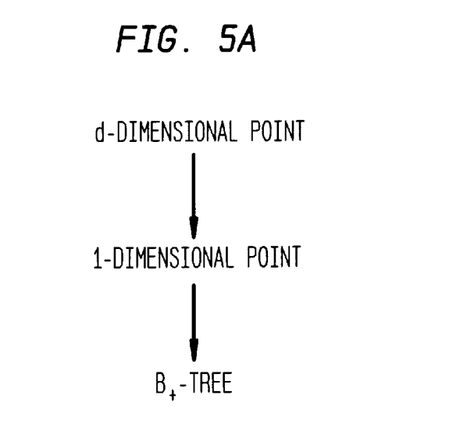
FIGS. 5(a)–(b) illustrate operations on Pyramid-Trees.
Figure 5B:
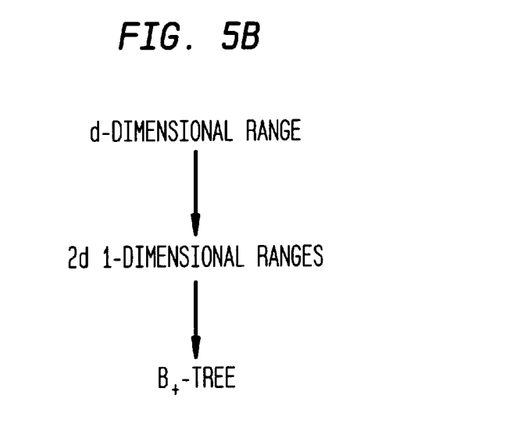

The basic idea of the Pyramid-Technique is to transform the d-dimensional data points into 1-dimensional values and then store and access the values using an efficient index structure such as the B+-tree. It will be understood that any order-preserving one-dimensional access method can also be used. Operations such as insert, update, delete or search operations are performed using the B+-tree. FIGS. 5(a)–(b) depicts the general procedure of an insert operation and the processing of a range query. In both cases, the d-dimensional input is transformed into some 1-dimensional information which can be processed by the B+-tree. Note that, although the data is indexed using a 1-dimensional key, the invention stores d-dimensional points plus the corresponding 1-dimensional key in the leaf nodes of the B+-tree. Therefore, an inverse transformation does not need to be provided. The transformation itself is based on a specific partitioning of the data space into a set of d-dimensional pyramids. Thus, in order to define the transformation, the data space partitioning of the Pyramid-Technique will be explained.

Figure 6A:
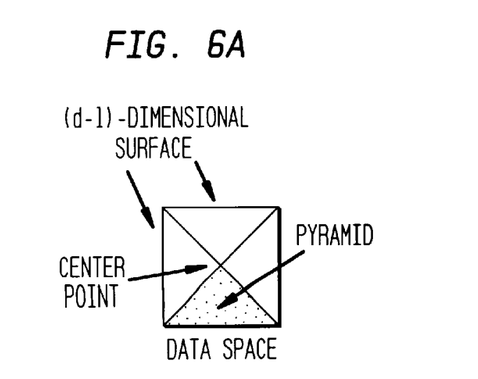
FIGS. 6(a)–(b) illustrate partitioning the data space into Pyramids.

The Pyramid-Technique partitions the data space in two steps: in the first step, the data space is split into 2d pyramids having the center point of the data space (0.5, 0.5, . . . , 0.5) as their top and a (d−1)-dimensional surface of the data space as their base. In a second step, each of the 2d pyramids is divided into several partitions each corresponding to one data page of the B+-tree. In the 2-dimensional example depicted in FIGS. 6(a)–(b), the space has been divided into 4 triangles (the 2-dimensional analogue of the d-dimensional pyramids) which all have the center point of the data space as top and one edge of the data space as base (FIG. 6(a)). In a second step, these 4 partitions are split again into several data pages parallel to the base line (FIG. 6(b)). Given a d-dimensional space instead of the 2-dimensional space, the base of the pyramid is not a 1-dimensional line such as in the example, but a (d−1)-dimensional hyperplane. As a cube of dimension d has 2d (d−1)-dimensional hyperplanes as a surface, 2d pyramids are obtained.

Figure 7A:
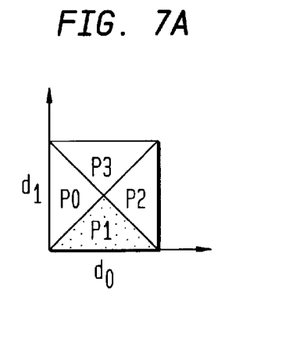
FIGS. 7(a)–(b) illustrate properties of pyramids.
Figure 7B:
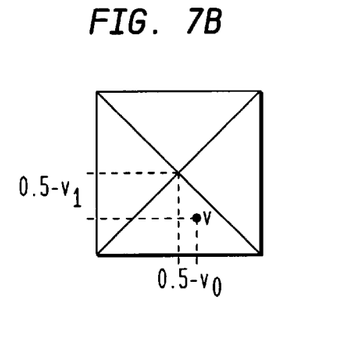

Numbering the pyramids as in the 2-dimensional example illustrated in FIG. 7a, the following observations which are the basis of the partitioning strategy of the Pyramid-Technique can be made. All points located on the i-th (d−1)-dimensional surface of the cube (the base of the pyramid) have the common property that either their i-th coordinate is 0 or their (i−d)-th coordinate is 1. The base of the pyramid is a (d−1)-dimensional hyperplane, because one coordinate is fixed and (d−1) coordinates are variable. On the other hand, all points v located in the i-th pyramid $p_i$ have the common property that the distance in the i-th coordinate from the center point is either smaller than the distance of all other coordinates if i<d, or larger if i≧d. More formally:

$\forall j, 0 \leq j < d, j \neq i: (|0.5-v_i| \leq |0.5-v_j|)$ if(i<d)

$\forall j, 0 \leq j < d, j \neq (i-d): (|0.5-v_{(i-d)}| \geq |0.5-v_j|)$ if (i≧d)

Figure 6B:
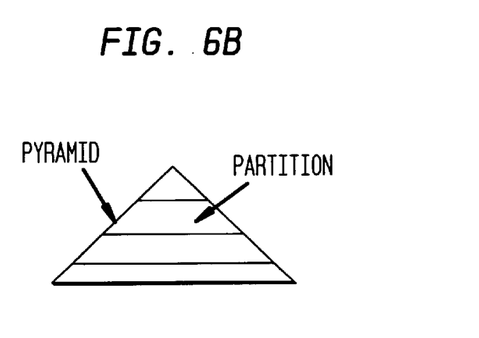

FIG. 6b depicts this property in two dimensions: all points located in the lower pyramid are obviously closer to the center point in their $d_0$-direction than in their $d_1$-direction. This common property provides a very simple way to determine the pyramid $p_1$ which includes a given point v: the dimension i having the maximum deviation $|0.5-v_i|$ from the center only need be determined. More formally:

Definition 1: (Pyramid of a point v)

A d-dimensional point v is defined to be located in pyramid $p_i$, $$i = \begin{cases} j_{\max} & \text{if}(v_{j_{\max}} < 0.5) \\ (j_{\max} + d) & \text{if}(v_{j_{\max}} \geq 0.5) \end{cases}$$

$$j_{\max} = \left(j \big| (\forall k, 0 \leq (j,k) < d, j \neq k: |0.5 - v_j| \geq |0.5 - v_k|)\right)$$

Note that all further considerations are based on this definition which therefore is crucial for the present technique. Another important property is the location of a point v within its pyramid. This location can be determined by a single value which is the distance from the point to the center point according to dimension $j_{max}$. As this geometrically corresponds to the height of the point within the pyramid, this is called the location height of v.

Definition 2: (Height of a point v)

Given a d-dimensional point v. Let $p_i$ be the pyramid in which v is located according to Definition 1. Then, the height $h_v$ of the point v is defined as $h_v = |0.5 - v_i|$ Using Definition 1 and Definition 2, a d-dimensional point v is transformed into a value $(i+h_v)$ where i is the index of the according pyramid $p_i$ and $h_v$ is the height of v within $p_i$.

Definition 3: (Pyramid value of a point v)

Given a d-dimensional point v. Let $p_i$ be the pyramid in which v is located according to Definition 1 and $h_v$ be the height of v according to Definition 2. Then, the pyramid value $pv_v$ of v is defined as $pv_v = (i+h_v)$ Note that i is an integer and $h_v$ is a real number in the range [0, 0.5]. Therefore, each pyramid $p_i$ covers an interval of $[i,(i+0.5)]$ pyramid values and the sets of pyramid values covered by any two pyramids $p_i$ and $p_j$ are disjunct. Note further that this transformation is not injective, i.e., two points v and v' may have the same pyramid value. But, as mentioned above, an inverse transformation is not required and therefore a bijective transformation is not required.

Given the transformation determining the pyramid value of a point q, it is a simple task to build an Index based on the Pyramid-Technique. In order to dynamically insert a point v, the pyramid value $pv_v$ of the point must first be determined and the point must be inserted into a B+-tree using $pv_v$ as a key. Finally, the d-dimensional point v and $pv_v$ are stored in the according data page of the B+-tree. Update and delete operations can be done analogously. Note that B+-trees can be bulk-loaded very efficiently e.g, when building a B+-tree from a large set of data items. The bulk-loading techniques for B+-trees can be applied to the Pyramid-Technique, as well.

Figure 8:
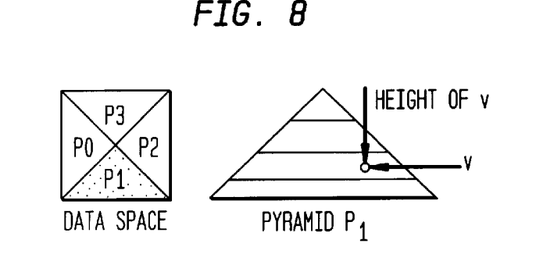
FIG. 8 illustrates the height of a point within a Pyramid.

In general, the resulting data pages of the B+-tree contain a set of points which all belong to the same pyramid and have the common property that their pyramid value lies in an interval given by the minimal and maximal key value of the data pages. Thus, the geometric correspondence of a single B+-tree data page is a partition of a pyramid as shown in FIG. 8.

In contrast to the insert, delete and update operation, query processing using the Pyramid-Technique is a complex operation. Point queries are defined as "Given a query point q, decide whether q is in the database". Using the Pyramid-Technique, the problem can be solved by first computing the pyramid value $pv_q$ of q and querying the B+-tree using $pv_q$. As a result, a set of d-dimensional points sharing $pv_q$ as a pyramid value is obtained. Thus, the set can be scanned to determine whether the set contains q and the result is outputted.

In case of range queries, the problem is defined as follows: "Given a d-dimensional interval $[q_{0_{min}}, q_{0_{max}}], \ldots, [q_{d-1_{min}}, q_{d-1_{max}}]$, determine the points in the database which are inside the range." Note that the geometric correspondence of a multidimensional interval is a hyper-rectangle. Analogously to point queries, the problem of transforming the d-dimensional query into a 1-dimensional query on the B+-tree must be faced. However, as the simple 2-dimensional example depicted in FIG. 9 demonstrates, a query rectangle may intersect several pyramids and the computation of the area of intersection is not trivial. First it must be determined which pyramids are affected by the query, and second the ranges inside the pyramids. The test whether a point is inside the ranges is based on a single attribute criterion ($h_v$ between two values). Therefore, determining all such objects is a one-dimensional indexing problem. Objects outside the ranges are guaranteed not to be contained in the query rectangle. Points lying inside the ranges, are candidates for a further investigation. It can be seen in FIG. 9 that some of the candidates are hits, others are false hits. Then, a simple point-in-rectangle-test is performed in the refinement step.

For simplification, the description of the algorithm is focused only on pyramids $p_i$ where i<d, however, the algorithm can be extended to all pyramids in a straightforward way. As a first step of the algorithm, the query rectangle q is transformed into an equivalent rectangle such that the interval is defined relative to the center point.

$$\hat{q}_{j_{min}} = q_{j\ min} - 0.5 \text{ and } \hat{q}_{j_{max}} = q_{j_{max}} - 0.5, \forall j, 0 \leq j < d$$

Additionally, any point v in this embodiment is defined relative to the center point of the data space. Based on Definition 1, it can be determined if a pyramid $p_i$ is affected by a given query As will be described below, the absolute minimum and maximum of an interval must be determined which is defined as follows: Let $MIN(r) = min(|r_{min}|, |r_{max}|)$ be defined as the minimum of the absolute values of an interval r and $MAX(r) = max(|r_{min}|, |r_{max}|)$ be the corresponding maximum.

Note that $|r_{min}|$ may be larger than $|r_{max}|$.

Lemma 1: (Intersection of a Pyramid and a Rectangle)

A pyramid pi is intersected by a hyperrectangle $[\hat{q}_{0_{min}}, \hat{q}_{0_{max}}], \ldots, [\hat{q}_{d-1_{min}}, \hat{q}_{d-1_{max}}]$ if and only if $$\forall j, 0 \leq j < d, j \neq i : (MAX(\hat{q}i) \geq MIN(\hat{q}j))$$

Proof:

The query rectangle intersects pyramid $p_i$, if there exists a point v inside the rectangle which falls into pyramid $p_i$. Thus, the coordinates $|v_j|$ of v must all be smaller than $|v_i|$. This, however, is only possible if the minimum absolute value in the query rectangle in dimension j is closer to the center point than the maximum absolute value in the query rectangle in dimension i is to the center point. Lemma 1 follows from the fact that this must hold for all dimensions j.

Figure 9:
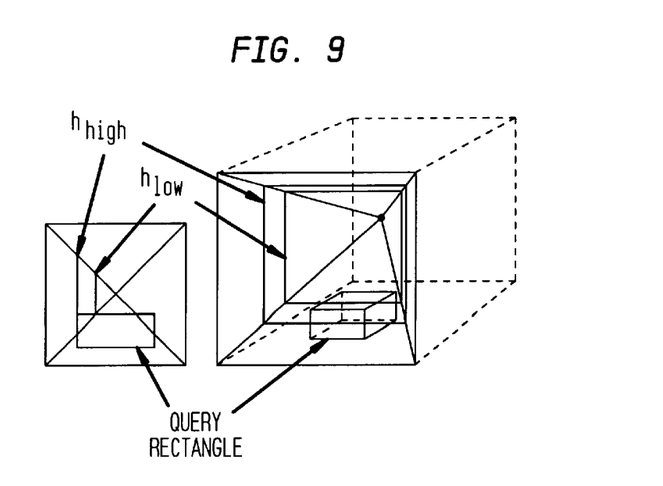
FIG. 9 illustrates the transformation of range queries.

In the second step, it must be determined which pyramid values inside an affected pyramid $p_i$ are affected by the query. Thus, we are looking for an interval $[h_{low}, h_{high}]$ in the range of $[0, 0.5]$ such that the pyramid values of all points inside the intersection of the query rectangle and pyramid $p_i$ are in the interval $[i+h_{low}, i+h_{high}]$. FIG. 9 depicts this interval for two and three dimensions.

In order to determine $h_{low}$ and $h_{high}$, the query rectangle is restricted to pyramid $p_i$ i.e., all points above the center point are removed:

$$\hat{q}_{i_{min}} = \hat{q}_{i_{min}}, \hat{q}_{i_{max}} = min(\hat{q}_{i_{max}}, 0),$$

$$\hat{q}_{j_{min}} = \hat{q}_{j_{min}}, \text{ and } \hat{q}_{j_{max}} = \hat{q}_{j_{max}}, \text{ where } (0 \leq j < d), j \neq i$$

Figure 10A:
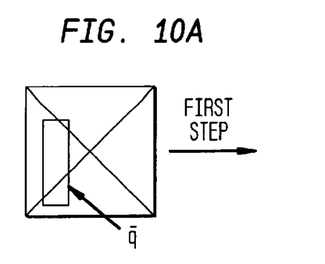
Figure 10B:
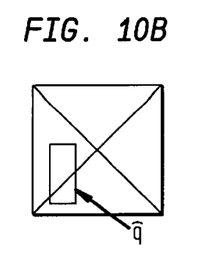

The effect of this restriction is depicted in a two-dimensional example in FIGS. 10(a)–(b). The determination of the interval $[h_{low}, h_{high}]$ is very simple if the center point of the data space is included in the query rectangle, i.e., $\forall j, (0 \leq j < d): (\hat{q}_{j_{min}} \leq 0 \leq \hat{q}_{j_{max}})$. In this case, we simply use the extension of the query rectangle as a result, thus:

$$h_{low} = 0 \text{ and } h_{high} = MAX(\hat{q}_i).$$

If the center point is not included in the query rectangle, it is first observed that $h_{high} = MAX(\hat{q}_i)$. This is due to the fact that the query rectangle must contain at least one point v such that $v_i = MAX(\hat{q}_i)$ because otherwise there would be no intersection between the query rectangle and pyramid $p_i$.

Figure 10C:
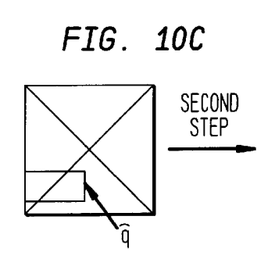
Figure 10D:
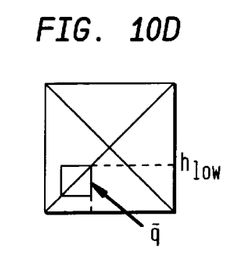

In order to find the value $h_{low}$, the minimum height of points inside the query rectangle and the pyramid $p_i$ must be determined. Consider points which are inside $\hat{q}$ and inside $p_i$, all intervals $[\hat{q}_{j_{min}}, \hat{q}_{j_{max}}]$ $(0 \leq j < d)$, $j \neq i$ can intersect with $[\hat{q}_{i_{min}}, \hat{q}_{i_{max}}]$ without affecting the value $h_{low}$. Then, the minimum of the min-values of all dimensions of the new rectangle equals $h_{low}$. FIGS. 10(c)–(d) show an example of this operation. Obviously, the checkered rectangles on the left and the right side of each example are causing the same value $h_{low}$.

Lemma 2: (Interval of Intersection of Query and Pyramid)

Given a query interval and an affected pyramid $p_i$, the intersection interval $[h_{low}, h_{high}]$ is defined as follows:

Case 1: $\forall j, (0 \leq j < d): (\hat{q}_{j_{min}} \leq 0 \leq \hat{q}_{j_{max}})$ $$h_{low} = 0$$

$$h_{high} = MAX(\overline{q}_i)$$

Case 2: (otherwise)

$$h_{low} = min_{(0 \leq j < d, j \neq i)} (\overline{q}_{j_{min}})(*)$$

$$h_{high} = MAX(\overline{q}_i)$$

$$\overline{q}_{j_{min}} = \begin{cases} max(MAX(\overline{q}_i), MIN(\overline{q}_j)) & \text{if } MAX(\overline{q}_j) \geq MIN(\overline{q}_i) \\ MIN(\overline{q}_i) & \text{otherwise} \end{cases}$$

$$\overline{q}_{i_{min}} = \hat{q}_{i_{min}}, \overline{q}_{i_{max}} = min(\hat{q}_{i_{max}}, 0),$$

$$\overline{q}_{j_{min}} = \hat{q}_{j_{min}} \text{ and } \overline{q}_{j_{max}} = \hat{q}_{j_{max}}, \forall j, (0 \leq j < d), j \neq i.$$

Proof:

For any point v which is located inside the query rectangle and an affected pyramid $p_i$ that the resulting query interval $[h_{high}, h_{low}]$ contains $|v_i|$. Note that it is assumed that i is smaller than d and thus $v_i < 0$. Therefore, it must be shown that $$h_{low} \leq |v_i| \leq h_{high}.$$

1. $|v_i| \leq h_{high}$:

This holds because $h_{high}$ is chosen such that $|v_i| \leq MAX(\hat{q}_i) = h_{high}$.

2. $h_{low} \leq v_i$:

If $\hat{q}$ contains the center point, then $h_{low}=0 \leq |v_i|$.

Figure 11:
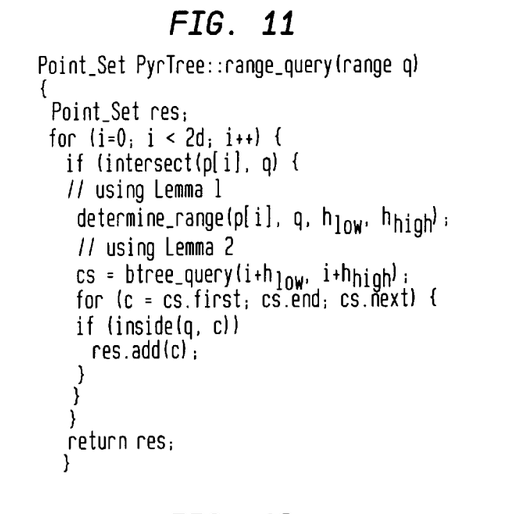
FIG. 11 illustrates processing range queries (algorithm)

Otherwise, $|v_i| \geq |v_j|, (\forall j, (0 \leq j, <d))$ because v is inside the pyramid i. On the other hand, $v_j \geq \hat{q}_{j_{min}}$, $\forall j, (0 \leq j<d)$ because v is inside the query rectangle and $v_j \geq q_{j_{min}}$ because all coordinates of v are negative for $0 \leq i<d$. Thus, $|v_j| \geq MIN(\hat{q}_j)$, $(\forall j, 0 \leq j>d)$. Additionally, $|v_i| \geq MIN(\hat{q}_i)$ because of the same reasons. Assembling the two results, it is derived: $|v_i| \geq \max(MIN(\hat{q}_i), MIN(\hat{q}_j)), \forall j, 0 \leq j<d$. From equation (*), however, follows that $\overline{q}_{j_{min}} \geq h_{low}$. Finally, $|v_i| \geq \max(MIN(\hat{q}_i), MIN(\hat{q}_j)) \geq h_{low}$. Lemma1 and Lemma 2 imply the simple query processing algorithm depicted in FIG. 11.

For this analysis, a uniform distribution of the data space and of the query hypercubes is assumed. A cost model for the Pyramid-Technique, comparable to the model described above, is proposed to analytically show the superiority of the Pyramid-Technique. Thus, the cost for processing hypercube shaped range queries having a side length larger than 0.5 is modeled to achieve a reasonable selectivity for high-dimensional queries. In this case, the center of the data space is always contained in the query and therefore, the window query is transformed into a set of exactly 2d one-dimensional range queries with, $h_{low}=0$ and $h_{high}=MAX(\hat{q}_i)$.

The concept of the Minkowski sum is not needed here because the performance of one-dimensional interval queries are being analyzed. However, we have to take into account that, in contrast to the points of the database, the pyramid values are not uniformly distributed.

Figure 12:
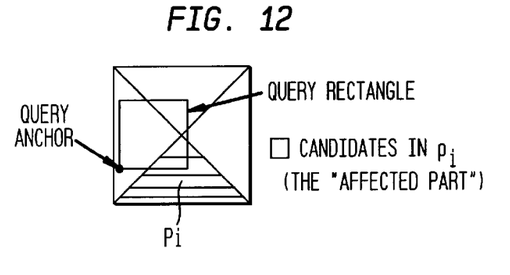
FIG. 12 illustrates modeling the Pyramid-Tree.

In the first step of this model, an expected value for the amount of data in each pyramid, which has to be accessed during query processing (the size of the candidate set) is determined. The lower left corner of the query $QA=(q_{0_{min}}, \ldots, q_{d-1_{min}})$ is considered as the anchor point of the query. QA is obviously taken from the multidimensional interval QAI= $[0, 1-q]^d$ to guarantee that the whole query is located inside the data space. Therefore, the height $h_{high}$ in pyramid $p_i$ is uniformly distributed in the interval $H_i=[q-0.5, 0.5]$ as illustrated in FIG. 12. The part of the hyper-pyramid, starting with $h_{low}=0$ and ending with $h_{high}$ (underlaid in grey in FIG. 12) is called the affected part of the pyramid. The volume of the affected part can be determined using the fact that it is the 2d-th part of a hypercube with side length $2 \cdot h_{high}$:

$$V(h_{high}) = \frac{(2 \cdot h_{high})^d}{2 \cdot d}$$

From this volume of the affected part for a given $h_{high}$, the expected value can be determined by forming an average over all possible positions of $h_{high}$ in the interval $H_i$. Thus, the invention integrates over $h_{high}$ and then divides the result by the size of the interval $H_i$, which yields the following integral formula:

$$E_v(d, q) = \frac{\int_{q-0.5}^{0.5} V(h_{high}) d h_{high}}{0.5 - (q - 0.5)}$$

The integral can be evaluated and simplified to:

$$E_v(d, q) = \frac{1 - (2q - 1)^{d+1}}{4d \cdot (1 - q) \cdot (d + 1)}$$

As $E_v(d,q)$ is the expected volume of the affected part for a query of size q in a single pyramid, under the uniformity assumption, $2d \cdot E_v(d,q) \neq (N/2d) = E_v(d,q) \neq N$ is the expected total number of objects in the affected parts of all pyramids. These objects are the candidates for an exact-geometry test of d-dimensional range containment. Since it is unlikely that the affected part is perfectly aligned with a break between two subsequent pages, the question is, how many data pages are occupied by the candidates. Note that all candidates belong to a single interval of pyramid values and therefore, the candidates are stored contiguously on the data pages. Thus, assuming a pagination with the effective page capacity $C_{eff}$, the system has to descend the directory of the B+-tree for each pyramid to find the object with the lowest pyramid value in each pyramid. This object may be located anywhere inside a data page. Then, the system has to read a run with the length of $E_v(d,q) \neq N$ objects, which occupies $E_v(d,q) \neq N/C_{eff}$ data pages. The last object is, again located somewhere on a data page with an equal probability of every position on the page. On average, the system has to read half a page before and after the run, respectively. Therefore, the required number of accesses to data pages for all 2d pyramids is:

$$E_{pyramidtree}(d, q, N) = \frac{2d + N \cdot (1 - (2q - 1)^{d+1})}{2C_{eff}(d) \cdot (d + 1) \cdot (1 - q)}$$

Figure 13:
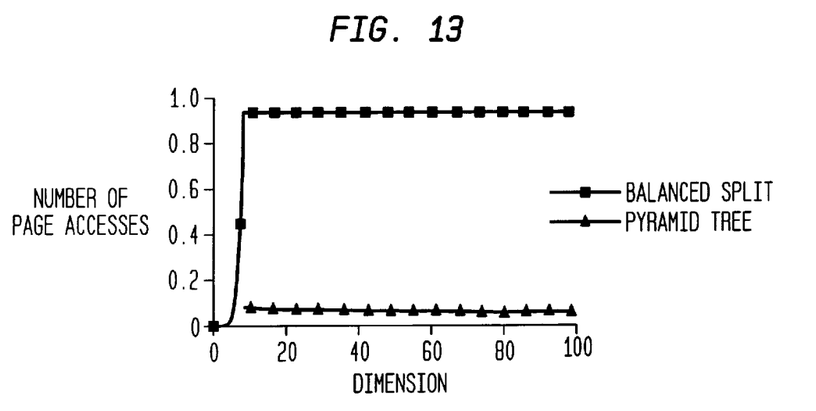
FIG. 13 is a graph illustrating the number of page accesses when processing range queries for the Pyramid-Tree and Balancing splitting.

The number of accesses to directory pages is 2d times the height of the B+-tree $\log_{C_{eff,dirpg}}(N/C_{eff})$ and can be neglected because the directory fits into the cache. FIG. 13 depicts the performance of the Pyramid-Technique as predicted by the model and, in comparison, the estimated cost when using balanced splitting. The Pyramid-Technique does not reveal any performance degeneration in high dimensions.

Figure 14A:
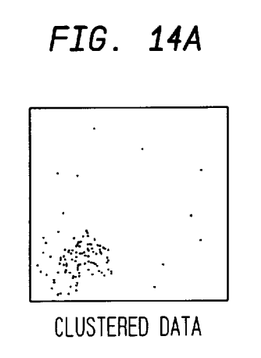
Figure 14B:
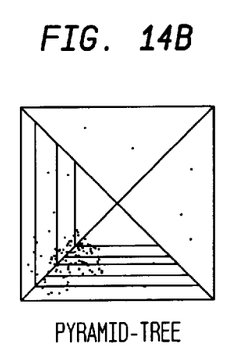
Figure 14C:
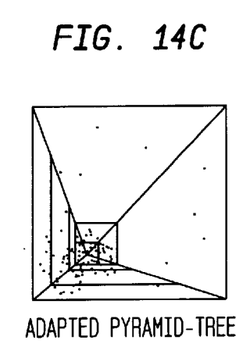

The above discussion was based on the assumption that the data is uniformly distributed. However, data produced by real-life applications does not behave this way. For example, if most of the data is located in one corner of the data space as illustrated in FIG. 14(a), obviously, only a few pyramids (in the extreme case only one) will contain most of the data while the other pyramids are nearly empty. This, however, will result in the suboptimal space partitioning depicted in the example in FIG. 14(b). Obviously, partitioning is suboptimal because it can be assumed that real-life queries are similarly distributed as the data itself Under this realistic assumption, a much better partitioning for the same data set is shown in FIG. 14(c).

The basic idea of the extended Pyramid-Technique is to achieve such a partitioning by transforming the data space such that the data cluster is located in the center point (0.5, ..., 0.5) of space. Thus, the given data space must be mapped to the canonical data space $[0, 1]^d$ such that the d-dimensional median of the data is mapped to the center point. However, the transformation is only applied to determine the pyramid values of points and query rectangles, but not to the points itself Therefore, inverse transformation does not need to be applied to the answer set.

As the computation of the d-dimensional median is a hard problem, the following heuristic is used to determine an approximation of the d-dimensional median. A histogram for each dimension is maintained to keep track of the median in this dimension. The d-dimensional median is then approximated by the combination of the d one-dimensional medians. Obviously, the approximated d-dimensional median may be located outside the convex hull of the data cluster. As the experiments showed, this effect occurs very rarely and therefore the performance of our algorithms is not affected. The computation of the median can either be done dynamically in case of dynamic insertions, or once in case of a bulk-load of the index. Given the d-dimensional median mp of the data set, we define a set of d functions $t_i$, $0 \leq i < (d-1)$ transforming the given data space in dimension i such that the following conditions hold:

1. $t_i(0)=0$
2. $t_i(1)=1$
3. $t_i(mp_i)=0.5$
4. $t_i: [0,1]\rightarrow[0,1]$

The three conditions are necessary to assure that the transformed data space still has an extension of $[0 \ldots 1]^d$ (conditions 1 and 2), and that the median of the data becomes the center point of the data space (condition 3). Condition 4 assures that each point in the original data space is mapped to a point inside the canonical data space. The resulting functions $t_i$ can be chosen as an exponential function such that:

$$t_i(x) = x^r$$

Obviously, conditions 1, 2, and 4 are satisfied by $x^r$, $r \geq 0$, $0 \leq x \leq 1$. In order to determine the parameter r, we have to satisfy condition 3: $t_i(mp_i) = 0.5 = mp_i^r$. Thus, $$r = -\frac{1}{\log_2(mp_i)}$$

and $$t_i(x) = x^{-\frac{1}{\log_2(mp_i)}}$$

Figure 15A:
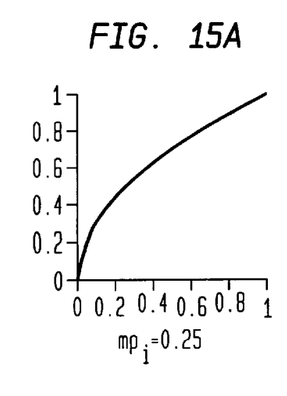
Figure 15B:
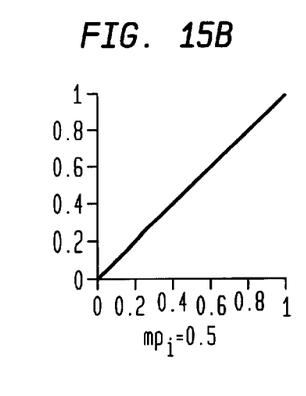
Figure 15C:
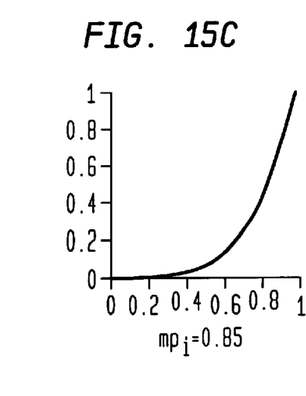

FIG. 15 illustrates three transformation functions $t_i$ for several values of $mp_i$.

Now, in order to insert a point v into an index using the extended Pyramid-Technique, v is transformed into a point $v'_i = t_i(v_i)$ and the pyramid value $pv_v$ is determined. Then, v is inserted using $pv_v$ as a key value as described above. In order to process a query, the query rectangle q (or query point) is transformed into a query rectangle q' such that $q'_{i_{min}} = t_i(q_{i_{min}})$ and $q'_{i_{max}} = t_i(q_{i_{max}})$. Note that q' is a rectangle because independent transformations are applied to each dimension. Next, the intervals of affected pyramid values and query the B+-tree are determined using the algorithm described above. As a result, a set of non-transformed d-dimensional points v are obtained which are tested against the original query rectangle q. Note that the transformations $t_i$ were used only to determine the pyramid value but the points have not been transformed.

If an index is dynamically built, the situation may occur that the first 10% of inserted points have a median different from that of the other 90% of the data. To handle this case, the current median is maintained by maintaining a histogram for each dimension and re-building the index, if the distance of the current median to the center point exceeds a certain threshold. Note that re-building the index is not too expensive because a bulk-load technique for B+-trees can be used. In order to determine a good threshold, the value $$th = \frac{\sqrt{d}}{4}$$

is used because the maximum distance from any point to the center point is $$\frac{\sqrt{d}}{2}$$

and therefore, the adapting process is guaranteed to terminate after a logarithmic number of steps. Note further that the probability that the median shifts and therefore the index has to be reorganized decreases with an increasing percentage of inserted data items. Therefore, a reorganization occurs very rarely in practice. Furthermore, experiments showed that a slightly shifted median has a negligible influence on the performance of the Pyramid-Technique.

To demonstrate the practical impact of the Pyramid-Technique and to verify the theoretical results, an extensive experimental evaluation of the Pyramid-Technique was performed and was compared to the following competitive techniques: X-tree; Hilbert-R-tree; and Sequential Scan.

The Hilbert-R-tree has been chosen for comparison, because the Hilbert-curve and other space filling curves can be used in conjunction with a B-tree in a so-called one-dimensional embedding. Since the Pyramid-Technique also incorporates a very sophisticated one-dimensional embedding, the Hilbert R-tree appears to be a natural competitive method.

Recently, criticism arose that index-based query processing is generally inefficient in high-dimensional data spaces, and that sequential scan processing yields better performance in this case. Therefore, the sequential scan was included in these experiments. While these experiments confirm the observation that the sequential scan outperforms the X-Tree and the Hilbert R-Tree for high dimensionalities, the present invention outperforms the sequential scan over in all experiments performed. The experiments have been computed on HP-9000/780 workstations with several GigaBytes of secondary storage.

The evaluation comprises both, real and synthetic data sets. In all experiments, range queries were performed with a defined selectivity because range queries serve as a basic operation for other queries such as nearest neighbor queries or partial range queries. The query rectangles are selected randomly from the data space such that the distribution of the queries equals the distribution of the data set itself and the query rectangles are fully included in the data space. Thus, in case of uniform data, uniformly distributed hypercube shaped query rectangles were used.

The synthetic data set contains 2,000,000 uniformly distributed points in a 100-dimensional data space. The raw data file occupies 800 MBytes of disk space. The main advantage of uniformly distributed point sets is, that it is possible to scale down the dimensionality of the point set by projecting out some of the dimensions without affecting the semantics of the query. Files with varying dimension and varying number of objects by projection and selection were created and various indexes were constructed using these raw data files.

Figure 16A:
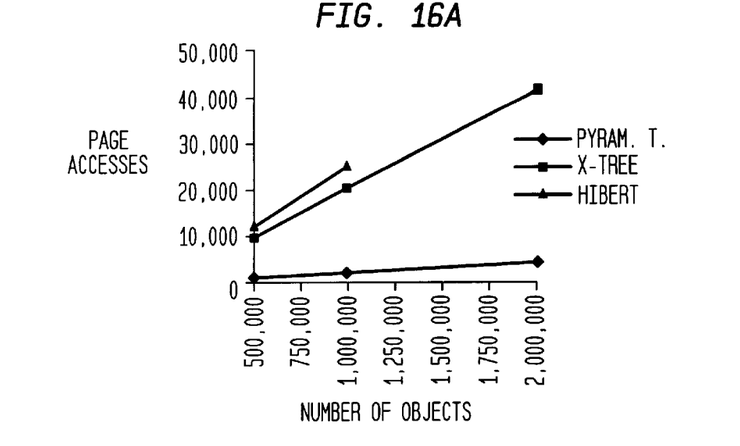
FIGS. 16(a)–(d) are graphs illustrating performance behavior over database size.
Figure 16B:
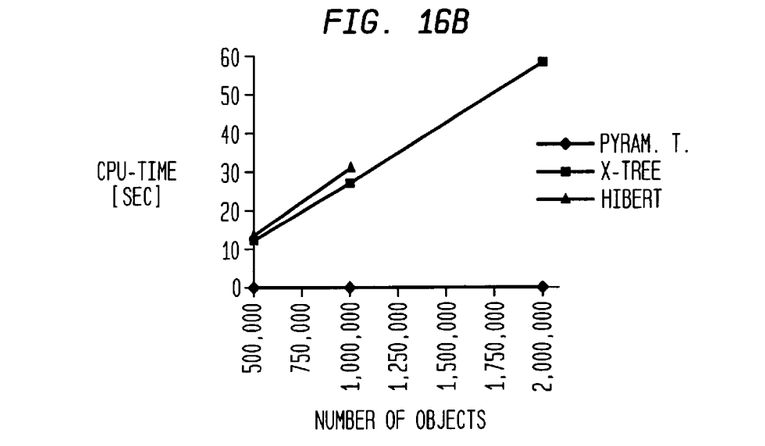
Figure 16C:
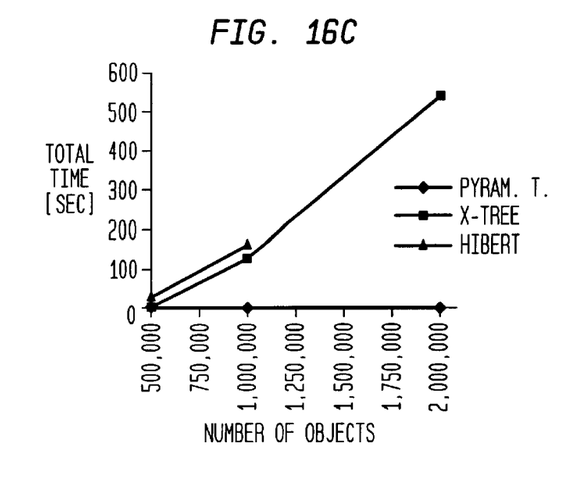
Figure 16D:
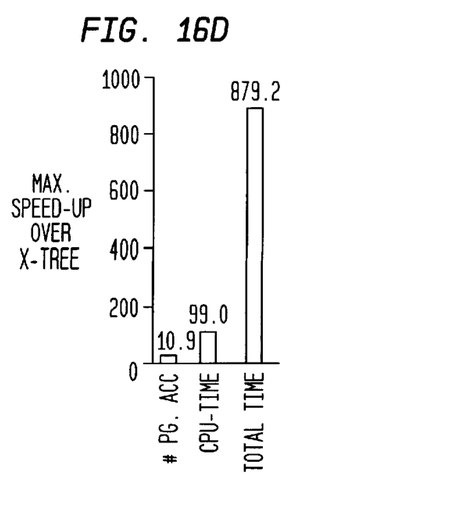
Figure 17A:
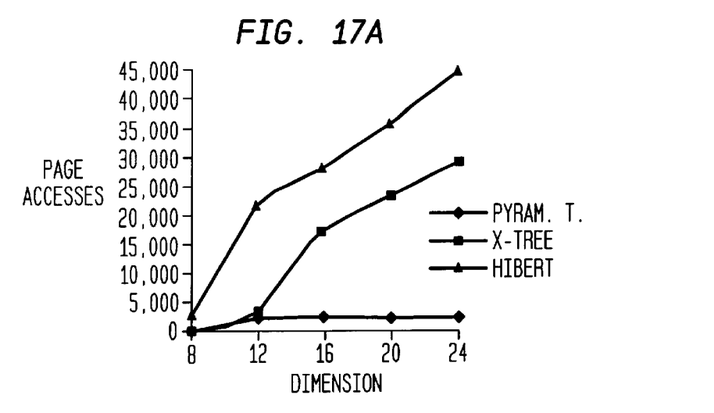
FIGS. 17(a)–(d) are graphs illustrating performance behavior over data space dimension.
Figure 17B:
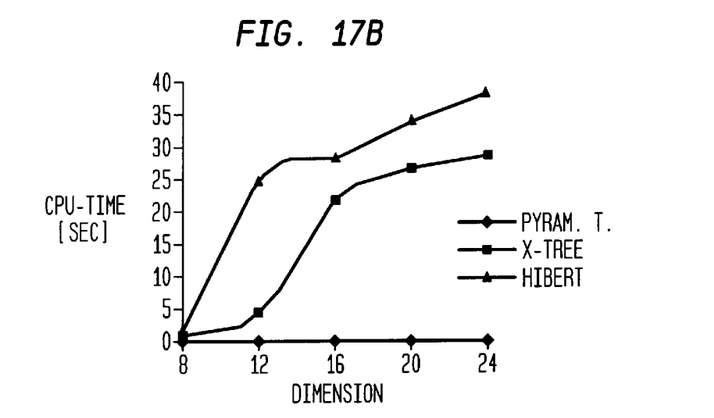
Figure 17C:
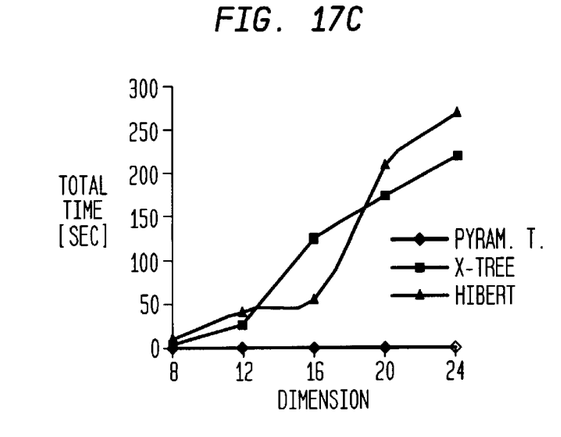
Figure 17D:
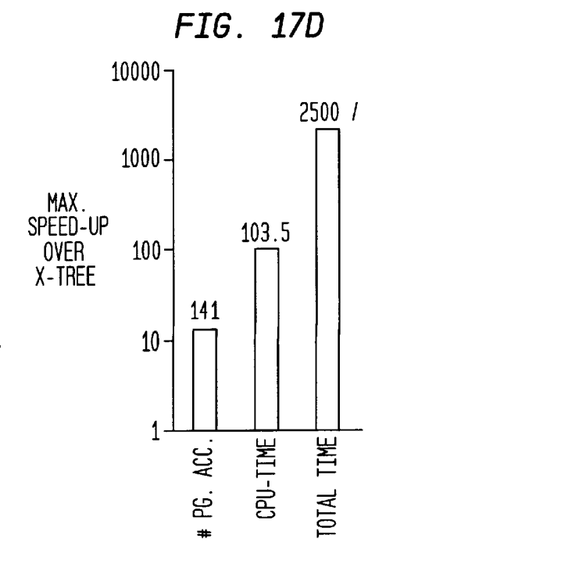

In the first experiment, the results of which are illustrated in FIGS. 16(a)–(d), the performance behavior was measured with varying number of objects. Range queries were performed with 0.1% selectivity in a 16-dimensional data space and varied the database size from 500,000 to 2,000,000 objects. Unfortunately, using this implementation the Hilbert-R-tree could only be constructed for a maximum of 1,000,000 objects due to limited main memory. The file sizes of all indexes in this experiment sum up to 1.1 GigaBytes. The page size in this experiment was 4096 Bytes, leading to an effective page capacity of 41.4 objects per page in all index structures. FIGS. 16(a)–(c) show the performance of query processing in terms of number of page accesses, absorbed CPU-time and finally the total elapsed time, comprising CPU time and time spent in disk i/o. The speed-up with respect to the number of page accesses seems to be almost constant and ranges between 9.78 and 10.91. The speed-up in CPU time is higher than the speed-up in page accesses, but is only slightly increasing with growing database sizes. The reason is that B+-trees facilitate an efficient in-page search for matching objects by applying bisection or interval search algorithms. However, most important is the speed-up in total elapsed time. It starts with factor 53, increases quickly and reaches its highest value with the largest database: The Pyramid-Technique with 2 million objects performs range queries 879 times faster than the corresponding X-tree! Range query processing on B+-trees can be performed much more efficient than on X-trees because large parts of the tree can be traversed efficiently by following the side links in the data pages. Moreover, long-distance seek operations inducing expensive disk head movements have a lower probability due to better disk clustering possibilities in B+-trees. The bar diagram illustrated in FIG. 16(d) summarizes the highest speed-up factors in this experiment.

In a second experiment, illustrated in FIGS. 17(a)–(d), the influence of the data space dimension on the performance of query processing was determined. For this purpose 5 data files were created as projections of the original data files with the dimensionalities 8, 12, 16, 20, and 24 (the database size in this experiment is 1,000,000 objects) and created the corresponding indexes. The total amount of disk space occupied by the index structures used in this experiment sums up to 1.6 GigaBytes. The page size in this experiment was again 4096 Bytes. The effective data page capacity depends on the dimension and ranged from 28 to 83 objects per page. Range queries with a constant selectivity of 0.01% were investigated. For a constant selectivity, the query range varies according to the data space dimension.

It was observed that the efficiency of query processing using the X-tree rapidly decreases with increasing dimension up to the point where large portions of the index are completely scanned (16-dimensional data space). From this point on, the page accesses are growing linearly with the index size. Even worse is the performance of the Hilbert R-tree. A comparable deterioration of the performance with increasing dimension is not observable when using the Pyramid-Technique. Here, the number of page accesses, the CPU and total elapsed time grow slower than the size of the data set. The percentage of accessed pages with respect to all data pages is even reduced with growing dimensions (decreasing from 7.7% in the 8-dimensional experiment to 5.1% in the 24-dimensional experiment). The experiment yields a speed-up factor over the X-tree of up to 14.1 for the number of page accesses, and 103.5 for the CPU time. Furthermore, the Pyramid-Technique is up to 2500.7 times faster in terms of total elapsed time than the X-tree.

Figure 18:
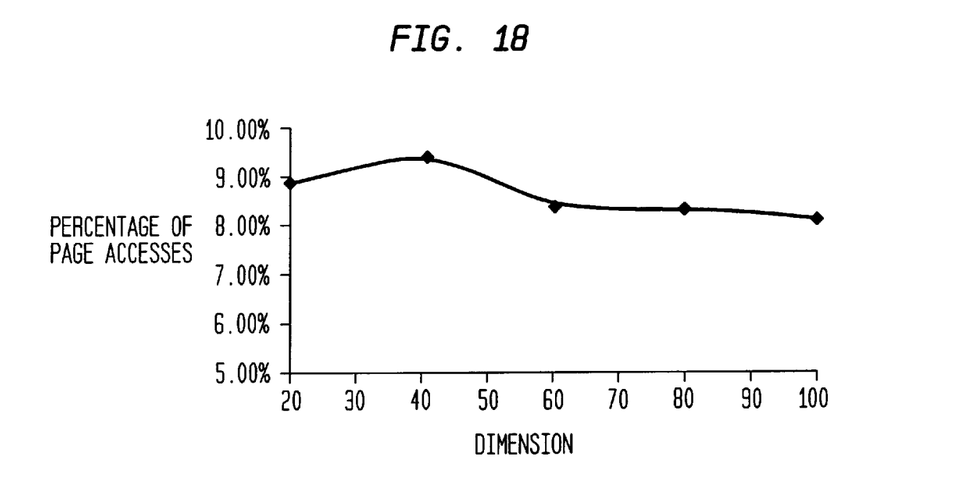
FIG. 18 is a graph illustrating the percentage of Accessed pages.

To demonstrate this observation that the percentage of pages accessed by the Pyramid-Technique decreases when going to higher dimensions, we determined the percentage of data pages accessed during query processing when indexing very high dimensions. FIGS. 18(a)–(d) depict the result of this experiment: The percentage drops from 8.8% in 20 dimensions to 8.0% in 100 dimensions.

Figure 19:
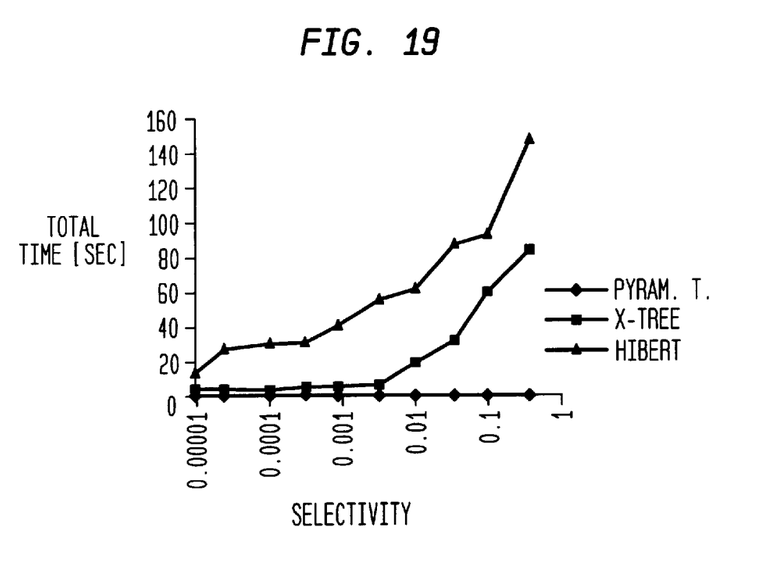
FIG. 19 is a graph illustrating query processing on text data.

In a different series of experiments, sets from two different application domains, information retrieval and data warehousing, were used to demonstrate the practical impact of the present invention. The first data set contains text descriptors, describing substrings from a large text database extracted from WWW-pages. These text descriptors have been converted into 300,000 points in a 16-dimensional data space and were normalized to the unit hypercube. The selectivity of the range queries was varied from 10-5 to 31% and the query execution time (total elapsed time) was measured. The result is presented in FIGS. 19(a)–(d) and confirms the earlier results on synthetic data that the Pyramid-Technique clearly outperforms the other index structures. The highest speed-up factor observed was 51. Additionally, the experiment shows that the Pyramid-Technique outperforms the competitive structures for any selectivity, i.e., for very small queries as well as for very large queries.

In a last series of experiments, the performance of the Pyramid-Technique on a data set taken from a real-life data warehouse was analyzed. The relation used has 13 attributes: 2 categorical, 5 integer, and 5 floating point attributes. There are some very strong correlations in some of the floating point attributes, some of the attributes follow a very skewed distribution, whereas some other attributes are rather uniformly distributed. The actual data set used comprises a subset of 803,944 tuples containing data of a few months. In a first experiment, the real time consumed during query processing was measured. Again, the Pyramid-Technique outperformed the other index structures by orders of magnitude. As expected, the speed-up increases when going to higher dimensions because the effects described in section 3 apply more for larger query ranges. However, even for the smallest query range in the experiment, the speed-up factor over the X-tree was about 10.47, whereas the speed-up for the largest query range was about 505.18 in total query execution time.

Figure 20:
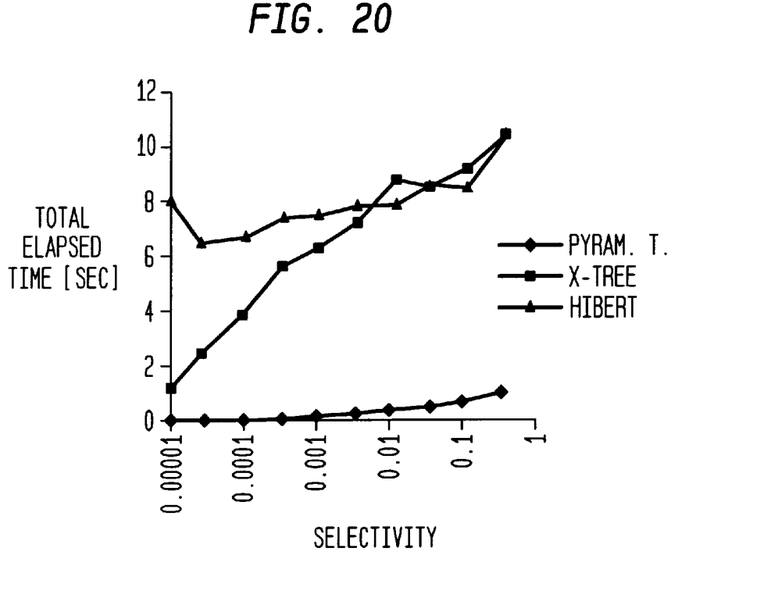
FIG. 20 is a graph illustrating query processing on warehousing data.

In a second experiment, the effect of the extension of the Pyramid-Technique disclosed above was measured. This experiment was made on this data set because the data is very skew and the median is rather close to the origin of the data space in most of the dimensions. FIG. 20 shows the effect of the extension. For all selectivities, there was a speed-up of about 10–40%. This shows first that for very skewed data, it is worth it reorganizing the index, and second that, if the reorganization is not performed, the loss of performance is not too high compared to the high speed-up factors over other index structures.

Figure 21:
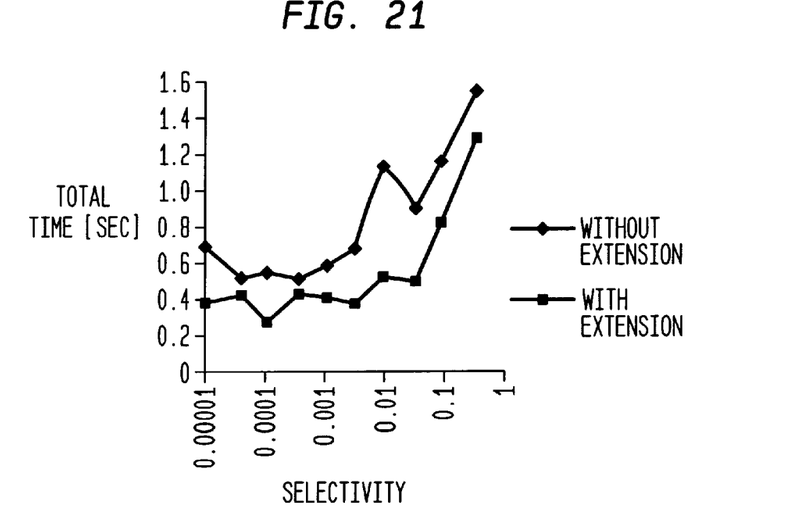
FIG. 21 is a graph illustrating the performance of the extended Pyramid-Tree.

A major point of criticism has been the argument that the Pyramid-Technique is designed for hypercube shaped range queries and might perform bad for other queries. Therefore, an additional experiment was performed investigating the behavior of the Pyramid-Technique for skewed queries. Partial range queries were generated shrinking the data space in k dimensions and having the full extension of the data space in (d–k) dimensions. These queries can be considered as (d–k)-dimensional hyper-slices in a d-dimensional space. As FIG. 21 shows, the Pyramid-Technique outperforms the linear scan for all of these queries except the 1-dimensional queries. For 1-dimensional queries, the Pyramid-Technique required 2.6 sec. compared to 2.48 sec. for the linear scan. However, a large improvement was observed for 8-dimensional to 13-dimensional queries. The X-Tree couldn't compete with the Pyramid-Technique for any of these queries.

It is further understood by those skilled in the art that the foregoing description is only of the preferred embodiments and that various changes and modifications may be made in the invention without departing from the spirit or scope thereof

What is claimed is:

1. A method for transforming multi-dimensional data points into 1-dimensional values which are stored in a 1-dimensional index structure, comprising the steps of:

splitting data space into a first plurality of pyramids each having a center point of the data space as a top and a d−1 dimensional surface, a number of dimensions equal to the number of dimensions of the data space minus 1, of the data space as a base, wherein said first plurality of pyramids is equal to twice the number of dimensions of the data space;

dividing each pyramid into a second plurality of partitions;

computing a Pyramid-value for each partition; and storing each partition in said index structure using said Pyramid-value as an index key.

2. A method according to claim 1, wherein said 1-dimensional index structure is created using an order-preserving 1-dimensional access method.

3. A method according to claim 2, wherein each partition and associated index key are stored in leaf nodes of the index structure.

4. A method according to claim 2, wherein each partition corresponds to one data page of the index structure.

5. A method according to claim 2, wherein said 1-dimensional index structure is a B+-tree.

6. A method according to claim 1, wherein each pyramid is divided parallel to the base of the pyramid to form said second plurality of partitions.

7. A method for storing and querying multidimensional data points, comprising the steps of:

splitting data space into a first plurality of pyramids each having a center point of the data space as a top and a d−1dimensional surface, a number of dimensions equal to the number of dimensions of the data space minus 1, of the data space as a base, wherein said first plurality of pyramids is equal to twice the number of dimensions of the data space;

dividing each pyramid into a second plurality of partitions;

computing a Pyramid-value for each partition;

storing each partition in a 1-dimensional index structure using said Pyramid-value as an index key;

computing the range of Pyramid-values affected by the query;

querying the index using said range to produce a candidate set of partitions;

outputting all candidate partitions that are inside the query range.

8. A method according to claim 7, wherein said 1-dimensional index structure is created using an order-preserving 1-dimensional access method.

9. A method according to claim 8, wherein each partition and associated index key are stored in leaf nodes of the index structure.

10. A method according to claim 8, wherein each partition corresponds to one data page of the index structure.

11. A method according to claim 8, wherein said 1-dimensional index structure is a B+-tree.

12. A method according to claim 7, wherein each pyramid is divided parallel to the base of the pyramid to form said second plurality of partitions.

* * * * *